Sept. 13, 1938.    A. WOLF ET AL    2,130,213
VIBRATION DETECTOR
Filed Oct. 23, 1935
FIG.2.
FIG.1.
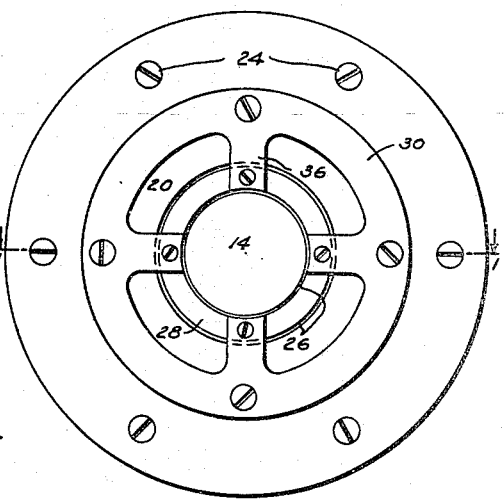
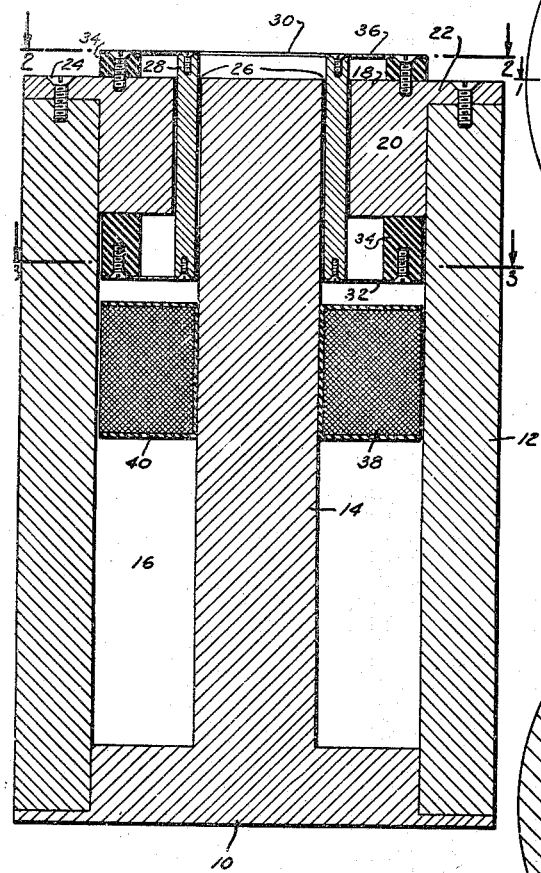
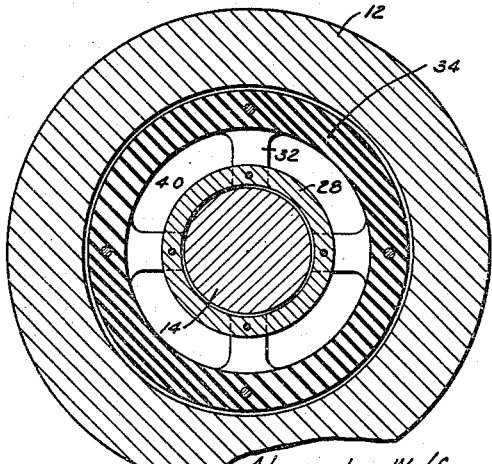
FIG.3.
Alexander Wolf
Laurence G. Cowles
William S. Richardson
INVENTORS
BY R. J. Newton
their ATTORNEY Patented Sept. 13, 1938

2,130,213

UNITED STATES PATENT OFFICE 2,130,213

VIBRATION DETECTOR

Alexander Wolf, Laurence G. Cowles, and William S. Richardson, Houston, Tex., assignors to The Texas Company, New York, N. Y., a corporation of Delaware Application October 23, 1935, Serial No. 46,242

6 Claims. (Cl. 177—352)

This invention relates to vibration detectors, more particularly to devices adapted to be placed on or buried in the earth so as to be responsive to, and to give indications of, earth vibrations. The device is especially well suited to the reception or detecting of compressional waves such as are passed through the earth in the carrying out of seismic methods of geophysical exploration.

The principal object of the invention is the provision of an electrical earth wave detector of rugged and simple construction in which electrical damping is effectively used. A further object of the invention is the provision of a detector having a high degree of sensitivity with a comparatively weak magnetic field.

In a common form of electrical earth vibration detector a strong permanent or electro-magnet is adapted to be mounted in firm contact with the earth so that it will be moved or vibrated in accordance with variations in the surrounding stratum. A coil of insulated wire is usually resiliently suspended in the air gap of the magnet and the relative motion of the magnet and the coil produces an E. M. F. in the coil which is then registered by suitable means. Various modifications of this type of detector are in use and the electrical sensitivity of these devices depends upon the strength of the magnetic field and on the space available in the air gap for coil winding.

In order to obtain a clear record of the waves received by the detector it is essential that some means be used for damping the relative movement of the magnet and coil and several different types of damping have been proposed and tried out. Damping is occasionally secured by fluid friction, that is, by the movement of some element in either a liquid such as oil or a gas. If oil is used the damping changes rapidly with temperature because of viscosity-temperature variation. To secure efficient air damping an elaborate system of baffle plates is usually required. If electrical damping is to be obtained it is usually necessary that the coil suspended in the air gap be partially short-circuited so that the E. M. F. induced in the short-circuited portion will produce a current tending to resist or oppose the relative motion between the magnet and the coil. This short-circuiting of a portion of the coil will, of course, cause a loss in sensitivity and for a given natural frequency of the coil and a given magnetic field strength the necessary loss of sensitivity is determined entirely by the product of resistivity by the specific gravity of the material forming the winding. The loss of sensitivity increases with the increase of this product and it is also increased by the presence of any inert material such as insulating material in the coil. For a given natural frequency of the coil and a given magnetic field strength the maximum damping is obtained when the coil is entirely short-circuited, but obviously the sensitivity is then zero. In most existing types of electrical earth vibration detectors used in seismic exploration by the reflection method the magnetic field is so weak and the natural frequency so high that it is either impractical or impossible to obtain good electrical damping.

In accordance with this invention a vibration detector has been provided in which electrical damping is used, thus having the great advantage of simplicity and independence of temperature for all practical purposes for the reasons mentioned hereinbefore. In providing the electrical damping the pickup coil ordinarily suspended in the air gap of the magnet is replaced by a solid ring of non-magnetic metal and the pick-up coil winding is then mounted on one of the pole pieces of the magnet. When the device is vibrated E. M. F. induced in the solid ring produces variations in the flux of the magnetic field and hence an E. M. F. in the pick-up coil. An added advantage is obtained in the possibility of using for the solid ring a material having a low product of resistivity by specific gravity such as aluminum, whereas aluminum cannot ordinarily be used in a winding since insulated aluminum wire is not readily obtainable.

For a better understanding of the invention reference may be had to the accompanying drawing in which Fig. 1 is a sectional elevation of a preferred embodiment of the invention taken on the line 1—1 of Fig. 2;

Fig. 2 is a plan view of the device shown in Fig. 1, and

Fig. 3 is a sectional plan view taken on the line 3—3 of Fig. 1.

Referring to the drawing, a permanent magnet 10 having a cylindrical outer pole 12 and an axially disposed inner pole 14 is adapted to be secured to or buried in the earth in a manner such that it will vibrate in response to compressional wave vibrations passing through the surrounding stratum. The magnet 10 may of course be mounted rigidly within a protecting casing if desired, the casing then being placed in contact with the earth. No casing has been shown in the drawing for purposes of simplicity. An annular space 16 is thus formed between the two poles of the magnet, this space serving to house the pick-up coil as will be explained hereinafter. An annular pole piece 18 having a depending body portion 20 and a flange portion 22 is secured to the upper end of the outer pole 12 by any suitable means such as by screws 24. A smaller annular space 26 is formed between the inner surface of the body portion of the pole piece 18 and the upper end of the pole 14 and a metallic ring 28 of non-magnetic material is resiliently suspended within the annular space 26 by means of an upper spring member 30 and a lower spring member 32. The spring members 30 and 32 are secured around their outer edges to the pole piece 18 by suitable screws, the spring members being separated from the pole piece by means of suitable spacers or washers 34 of insulating material. Although the spring members 30 and 32 are shown as spring metal discs having cut-out portions and radially projecting tongues 36 secured to the ring 28, any other suitable form of spring mounting for the ring may be used. The ring 28 thus forms an inertia member which will tend to remain immovable when the magnet member 10 is moved in response to earth vibrations. A pick-up coil comprising a winding 38 is placed in the annular space 16 around the inner pole 14 and a layer of suitable insulating material 40 forms a spool for this winding and serves to insulate the winding from the metal pole 14.

When the magnet 10 is moved in response to earth vibrations the metal ring 28 will tend to remain in its normal position and the relative movement thus produced between the magnet and the ring will cause currents to be induced in the ring, these currents in turn producing variations in the magnetic flux of the entire system. These variations in the flux of the magnetic circuit will thus cause an E. M. F. to be induced in the winding 38 and by connecting the winding to any suitable indicating or recording device indications of the earth vibrations may thus be obtained.

The currents induced in the metal ring 28 because of relative movement between the ring and the magnet will set up a flux opposing the normal flux of the magnetic circuit, which will thus serve as a very efficient damping means. The damping action produced on the ring 28 will be as effective as could be obtained if a short-circuited winding of the same size and material were used in place of the solid ring.

It will be observed that the annular space 16 is more than ample to house the winding 38 and since therefore the number of turns on this coil is practically unlimited, an extremely high sensitivity can be obtained. Since the only moving part of the device is the solid ring 28 it will be seen that a very rugged and inexpensive construction will result.

While a permanent magnet has been described and shown, it is to be understood that an electro-magnet may be used, the energizing winding for such a magnet being placed in the annular space 16.

Obviously many modifications and variations of the invention, as hereinbefore set forth, may be made without departing from the spirit and scope thereof, and therefore only such limitations should be imposed as are indicated in the appended claims.

We claim:

1. In a vibration detector, a member responsive to vibrations, said member comprising a magnet having a pair of poles substantially coextensive and disposed in parallel, the adjacent ends of said pole pieces forming an air gap, an inertia member of metallic non-magnetic material of a size to fill substantially all of said air gap, means for resiliently suspending said inertia member in said air gap, and a coil winding surrounding one of said poles a point spaced longitudinally from said air gap, said winding being adapted to have induced therein an E. M. F. produced by variations in flux caused by relative movement between said inertia member and the poles of said magnet.

2. In a vibration detector, a member responsive to vibrations, said member comprising a magnet having an annular outer pole and a pole disposed coaxially within said outer pole, an inertia member comprising a metal ring, means for resiliently suspending said ring between the ends of the poles of said magnet, said ring being of a size to fill substantially all of the space between said magnet poles, and a coil winding surrounding said inner pole and responsive to variations in flux produced by relative movement between said magnet and said ring, said winding being disposed around said inner pole at a point spaced from said inertia member.

3. In a vibration detector a magnet having a cylindrical outer pole and a pole disposed coaxially within said outer pole, an annular space being formed between said poles, a pole piece secured to the upper end of one of said poles and extending laterally toward the other pole, an air gap being formed between one edge of said pole piece and said other pole, an annular metal ring of a size to fill substantially all of said air gap, means for resiliently suspending said ring in said air gap and a coil winding disposed in said annular space at a point spaced longitudinally from said air gap and adapted to have an E. M. F. induced therein, said E. M. F. being produced by the variations in magnetic flux caused by relative movement between said ring and said magnet.

4. In a device for translating mechanical vibrations into electrical energy, a member responsive to vibrations, said member comprising a magnet having an annular outer pole and a pole disposed coaxially within said outer pole, an annular space being formed between said poles, an inertia member comprising a metallic ring of non-magnetic material, means for resiliently suspending said ring in said annular space between the adjacent ends of said poles, said ring being of a size to fill substantially all of said annular space, and a coil winding disposed in a portion of the annular space between said poles and spaced longitudinally from said inertia member, the arrangement being such that an E. M. F. will be induced in said coil by variations in flux caused by relative movement between said magnet and said ring.

5. In a vibration detector, a member responsive to vibrations, said member comprising a magnet having an annular outer pole and a pole disposed coaxially within said outer pole, an annular space being formed between the poles of said magnet, an inertia member comprising a metal ring, means for resiliently suspending said ring in said annular space between the adjacent ends of said poles, said ring being of a size to fill substantially all of said annular space, and a coil winding also disposed in said annular space but separated longitudinally from said inertia member and responsive to variations in the flux produced by relative movement between said magnet and said ring, the arrangement being such that currents induced in said ring by relative movement between said magnet and said ring will produce a flux opposing the normal flux of the magnetic circuit, thus serving to dampen the movement of said ring with respect to said magnet.

6. In a vibration detector, a member responsive to vibrations, said member comprising a magnet having a pair of poles disposed concentrically in parallel, said poles being substantially coextensive and the adjacent ends of said poles forming an air gap, an inertia member comprising a non-magnetic metal ring, means for resiliently suspending said ring in said air gap, said ring being of a size such as to fill substantially all of the space in said air gap, and a coil winding surrounding one of said poles at a point spaced from said air gap longitudinally along the axis of said pole, said winding being adapted to have induced therein an E. M. F. produced by variations in flux caused by relative movement between said inertia ring and the poles of said magnet.

ALEXANDER WOLF.
LAURENCE G. COWLES.
WILLIAM S. RICHARDSON.